United States Patent
Damodaran et al.

(10) Patent No.: US 11,812,167 B2
(45) Date of Patent: Nov. 7, 2023

(54) DETERMINING PIXEL INTENSITY VALUES IN IMAGING

(71) Applicant: KONINKLIJKE PHILIPS N.V., Eindhoven (NL)

(72) Inventors: Mathivanan Damodaran, 'S-Hertogenbosch (NL); Rieko Verhagen, Vught (NL); Yannyk Parulian Julian Bourquin, Eindhoven (NL); Jonathan Alambra Palero, Waalre (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 17/798,585

(22) PCT Filed: Feb. 3, 2021

(86) PCT No.: PCT/EP2021/052460
§ 371 (c)(1),
(2) Date: Aug. 10, 2022

(87) PCT Pub. No.: WO2021/165035
PCT Pub. Date: Aug. 26, 2021

(65) Prior Publication Data
US 2023/0089886 A1    Mar. 23, 2023

(30) Foreign Application Priority Data

Feb. 20, 2020  (EP) .................................... 20158431

(51) Int. Cl.
*H04N 25/47* (2023.01)
*H04N 23/745* (2023.01)
*H04N 25/48* (2023.01)

(52) U.S. Cl.
CPC ........... *H04N 25/47* (2023.01); *H04N 23/745* (2023.01); *H04N 25/48* (2023.01)

(58) Field of Classification Search
CPC ...... H04N 25/47; H04N 23/745; H04N 25/48; H04N 23/70; H04N 23/76; H04N 23/82;
(Continued)

(56) References Cited

U.S. PATENT DOCUMENTS

2007/0070214 A1  3/2007  Nakamura
2010/0002093 A1  1/2010  Arai
(Continued)

FOREIGN PATENT DOCUMENTS

JP    H04165876 A   6/1992
JP    2007180892 A  7/2007
(Continued)

OTHER PUBLICATIONS

International Search Report and Written Opinion dated May 10, 2021 for International Application No. PCT/EP2021/052460 Filed Feb. 3, 2021.
(Continued)

*Primary Examiner* — Albert H Cutler (57) ABSTRACT

In an embodiment, a method (100) is described. The method includes accessing (102) data from a sequence of images of a subject illuminated with ambient light and illumination having a sinusoidal intensity modulation in time. An imaging device is used to obtain the sequence of images and is configured such that a different spatial intensity modulation pattern is apparent in consecutive images of the sequence. The method further includes determining (104), based on a set of measured pixel intensity values in each of the sequence of images, a set of revised pixel intensity values for generating a revised image of the subject such that a reduced level of ambient lighting is apparent in the revised
(Continued)

image compared with the level of ambient lighting apparent in at least one of the sequence of images.

19 Claims, 5 Drawing Sheets

(58) Field of Classification Search
CPC ........ H04N 23/73; H04N 23/74; H04N 23/80; H04N 25/531; H04N 23/56
See application file for complete search history.

(56) References Cited

U.S. PATENT DOCUMENTS

| | | | |
|---|---|---|---|
| 2010/0073510 A1 | 3/2010 | Nemoto | |
| 2012/0002074 A1 | 1/2012 | Baba | |
| 2017/0280041 A1* | 9/2017 | Yu | H04N 23/745 |
| 2017/0280042 A1 | 9/2017 | Tadano | |
| 2018/0024423 A1 | 1/2018 | Hashimoto | |
| 2019/0068862 A1 | 2/2019 | Guterman | |
| 2019/0166298 A1 | 5/2019 | Tasdizen | |
| 2019/0213719 A1 | 7/2019 | Hiasa | |
| 2020/0169658 A1* | 5/2020 | Nakamura | H04N 23/76 |
| 2020/0177789 A1* | 6/2020 | Sheinin | H04N 25/531 |
| 2020/0204772 A1* | 6/2020 | Gounelle | H04N 23/631 |

FOREIGN PATENT DOCUMENTS

| | | |
|---|---|---|
| JP | 2010119035 A | 5/2010 |
| JP | 2010157925 A | 7/2010 |
| WO | 2011009005 A2 | 1/2011 |
| WO | 2014/071099 A1 | 5/2014 |
| WO | 2016076897 A1 | 5/2016 |

OTHER PUBLICATIONS

Williams, et al: "Simultaneous correction of flat field and nonlinearity responses of intensified charge-coupled devices", Review of Scientific Instruments, vol. 78, No. 12, Dec. 13, 2007.
Kim, et al: "Radiometric calibration with illumination change for outdoor scene analysis", Computer Vision and Pattern Recognition 2008.
Written Opinion of the International Preliminary Examining Authority dated Dec. 23, 2021 for International Application No. PCT/EP2021/052460 Filed Feb. 3, 2021.
International Preliminary Report on Patentability dated Apr. 5, 2022 for International Application No. PCT/EP2021/052460 Filed Feb. 3, 2021.
Gioux, et al: "First-in-human pilot study of a spatial frequency domain oxygenation imaging system," J. Biomed. Opt., vol. 16, No. 8, p. 086015, 2011.
Vizireanu, et al: "Analytical formula for three points sinusoidal signals amplitude estimation errors," Int. J. Electron. 99, 149-151 (2012).
Vizireanu, et al: "Single sine wave parameters estimation method based on four equally spaced samples," Int. J. Electron. 98, 941-948 (2011).

* cited by examiner

DETERMINING PIXEL INTENSITY VALUES IN IMAGING

CROSS REFERENCE TO RELATED APPLICATIONS

This application is the U.S. National Phase application under 35 U.S.C. § 371 of International Application No. PCT/EP2021/052460 filed Feb. 3, 2021, which claims the benefit of European Patent Application Number 20158431.5 filed Feb. 20, 2020. These applications are hereby incorporated by reference herein.

FIELD OF THE INVENTION

The invention relates to a method, apparatus and tangible machine-readable medium for use in imaging in certain settings.

BACKGROUND OF THE INVENTION

A topic of interest in the field of non-obtrusive measurement and monitoring relates to skin sensing for personal care and health applications. Skin sensing systems are being developed that promise skin quantification and monitoring of features in the skin that may offer users information that is too small to detect, too faint to notice or too slow to follow. To deliver results that are acceptable to users, such skin sensing systems may need to provide sensitivity and specificity when performing skin sensing. Providing measurements taken by such skin sensing systems are proven to be robust and reliable, users may establish trust in these skin sensing systems.

Imaging-based skin sensing systems may need to determine information that could be affected by difficult-to-control parameters such as variations in ambient illumination. For example, certain uncontrolled environments such as at a user's home may feature undefined and/or potentially varying ambient illumination. Such uncontrolled environments may lead to erroneous measurements of a user's skin, which may, in turn, lead to unacceptable or untrusted results for the user. The imaging performance of some cameras (such as smartphone cameras) used in some imaging-based skin sensing systems may be variable such that the imaging data is unpredictable or unreliable.

The performance of other imaging-based sensing systems for acquiring information from a surface other than skin may also be adversely affected by certain uncontrolled environments. For example, a user wishing to acquire an image of an object for a certain application in an uncontrolled environment may find that the image may feature unacceptable illumination variation, which may affect how the image is perceived or subsequently processed.

US 2019/068862 A1 describes methods of creating frames captured with a video camera that are independent of light conditions are presented. In a first method, the addition of a modulated light source, for example amplitude modulation (AM), to the background light that illuminates the scene is captured. An algorithm is executed that generates processed images in which the effects of the background illumination have been eliminated.

Williams et al., "Simultaneous correction of flat field and nonlinearity response of intensified charge-coupled devices", Review of Scientific Instruments, Vol. 78, 123702 (2007) describes a general approach to flat field image correction.

JP 2010-119035 A1 describes an imaging apparatus including: an imaging section; a flash light detection section for detecting external flash light from an output of the imaging section; and an adaptive gamma processing section for performing correction conversion on an overall screen of output of the imaging section using a predetermined gamma value while flash light is not detected.

SUMMARY OF THE INVENTION

Aspects or embodiments described herein relate to improving imaging in certain settings. Aspects or embodiments described herein may obviate one or more problems associated with imaging in an uncontrolled environment.

In a first aspect, a method described. The method is a computer-implemented method. The method comprises accessing data from a sequence of images of a subject illuminated with ambient lighting and illumination having a sinusoidal intensity modulation in time. The sequence of images is obtained by an imaging device. The imaging device is configured to obtain, within each image of the sequence, a first spatial portion of the image at a different time to a second, different, spatial portion of the image, wherein a relationship between a frequency of the sinusoidal intensity modulation and a frame rate of the imaging device is such that a different spatial intensity modulation pattern is apparent in consecutive images of the sequence. The method further comprises determining, based on a set of measured pixel intensity values in each of the sequence of images, a set of revised pixel intensity values for generating a revised image of the subject by retrieving an amplitude of the sinusoidal temporally-modulated illumination from the sequence of images such that a reduced level of ambient lighting is apparent in the revised image compared with the level of ambient lighting apparent in at least one of the sequence of images.

Certain embodiments relating to the first aspect are described below.

In some embodiments, the set of revised pixel intensity values are determined such that both: the level of ambient lighting and a modulation depth of the spatial intensity modulation pattern is reduced in the revised image compared with at least one of the sequence of images.

In some embodiments, determining the set of revised pixel intensity values comprises computing, for each pixel of the set, a specified combination of the pixel's measured pixel intensity values from each of the sequence of images. The specified combination is determined based on the sinusoidal intensity modulation of the illumination.

In some embodiments, determining the set of revised pixel intensity values or estimated intensity distribution for the revised image is based on three or four consecutive images from the sequence of images.

In some embodiments, determining the set of revised pixel intensity values or estimated intensity distribution for the image is based on three consecutive images from the sequence of images where the spatial intensity modulation pattern for a first and fourth consecutive image in the sequence of images is the same.

In some embodiments, at least one of: a frequency of the sinusoidal intensity modulation and a frame rate of the imaging device; and a phase difference between the sinusoidal intensity modulation and frame acquisition timing of the imaging device is such that the different spatial intensity modulation pattern is apparent in consecutive images of the sequence.

In some embodiments, the frequency of the sinusoidal intensity modulation is not an integral multiple of the frame rate of the imaging device.

In some embodiments, the method comprises causing an illumination source to provide the illumination having the sinusoidal intensity modulation in time.

In some embodiments, the set of revised pixel intensity values or estimated intensity distribution, A, for the revised image is given by:

$$A = \frac{\sqrt{(I3(x, y) - I2(x, y))^2 - (I2(x, y) - I1(x, y)) * (I4(x, y) - I3(x, y))}}{\sqrt{2} * \left(1 - \frac{(I2(x, y) - I1(x, y)) + (I4(x, y) - I3(x, y))}{2 * ((I3(x, y) - I2(x, y)))}\right) * \sqrt{1 + \frac{(I2(x, y) - I1(x, y)) + (I4(x, y) - I3(x, y))}{2 * ((I3(x, y) - I2(x, y)))}}}$$

where I1(x, y), I2(x, y), I3(x, y) and I4(x, y) respectively represent a pixel intensity value of a first, second, third and fourth consecutive image in the sequence of images.

In some embodiments, the method comprises calculating a phase progression, φT, of the spatial intensity modulation pattern in the sequence of images according to:

$$\cos\varphi T = \frac{(I2(x, y) - I1(x, y)) + (I4(x, y) - I3(x, y))}{2 * ((I3(x, y) - I2(x, y)))}$$

where I1(x, y), I2(x, y), I3(x, y) and I4(x, y) respectively represent a pixel intensity value of a first, second, third and fourth consecutive image in the sequence of images.

In some embodiments, the method comprises compensating for a nonlinear response of the imaging device prior to: accessing the data from the sequence of images; and determining the set of revised pixel intensity values or estimated intensity distribution. The nonlinear response of the imaging device may be determined by: obtaining an indication of a mean intensity of a kernel comprising at least one pixel selected in an image sampled from a set of images of an object acquired by the imaging device; and determining the nonlinear response of the imaging device based on the indication of the mean intensity obtained for each image from the set of images.

In some embodiments, the method comprises causing an illumination source to illuminate the object by modulating the illumination source in accordance with an illumination function. The illumination function may be configured to at least one of: linearly increase and linearly decrease an intensity of the illumination function over a specified time interval while obtaining the indication of the mean intensity of the kernel sampled from the set of images.

In some embodiments, the method comprises causing the imaging device to acquire the set of images in accordance with an imaging acquisition function. The imaging acquisition function may be configured to one of: linearly increase and linearly decrease an exposure time for each subsequent image of the set of images while obtaining the indication of the mean intensity of the kernel sampled from the set of images.

In a second aspect, a tangible machine-readable medium is described. The tangible machine-readable medium stores instructions which, when executed by at least one processor, cause the at least one processor to implement the method according to the first aspect or any other embodiments described herein.

In a third aspect, apparatus is described. The apparatus comprises comprising processing circuitry. The processing circuitry comprises an accessing module and a determining module. The accessing module is configured to access data from a sequence of images of a subject illuminated with ambient lighting and illumination having a sinusoidal intensity modulation in time. The sequence of images is obtained by an imaging device. The imaging device is configured to obtain, within each image of the sequence, a first spatial portion of the image at a different time to a second, different, spatial portion of the image, wherein a relationship between a frequency of the sinusoidal intensity modulation and a frame rate of the imaging device is such that a different spatial intensity modulation pattern is apparent in consecutive images of the sequence. The determining module is configured to determine, based on a set of measured pixel intensity values in each of the sequence of images, a set of revised pixel intensity values for generating a revised image of the subject by retrieving an amplitude of the sinusoidal temporally-modulated illumination from the sequence of images such that a reduced level of ambient lighting is apparent in the revised image compared with the level of ambient lighting apparent in at least one of the sequence of images.

Certain embodiments relating to the third aspect are described below.

In some embodiments, the apparatus further comprises at an illumination source for providing the illumination.

In some embodiments, the apparatus further comprises the imaging device.

These and other aspects of the invention will be apparent from and elucidated with reference to the embodiment(s) described hereinafter.

BRIEF DESCRIPTION OF THE DRAWINGS

Exemplary embodiments of the invention will now be described, by way of example only, with reference to the following drawings, in which.

DETAILED DESCRIPTION OF THE EMBODIMENTS

Figure 1:
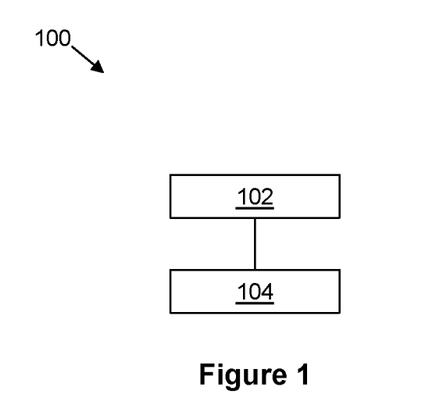
FIG. 1 refers to a method of improving imaging in certain settings according to an embodiment.

FIG. 1 shows a method 100 (e.g., a computer-implemented method) of improving imaging in certain settings. For example, imaging may be affected by certain settings such as in an uncontrolled environment where the illumination/ambient lighting is undefined and/or potentially varying. As will be described in more detail below, certain methods and apparatus described herein may reduce the effect of, compensate for or correct any undefined and/or potentially varying illumination/ambient lighting when imaging a subject in an uncontrolled environment.

The method 100 comprises, at block 102, accessing data from a sequence of images of a subject. The sequence of images is obtained by an imaging device. The subject is illuminated with ambient lighting and illumination having a sinusoidal intensity modulation in time. The imaging device is configured such that a different spatial intensity modulation pattern is apparent in consecutive images of the sequence.

The imaging device may obtain the sequence of images (e.g., continually over a period of time) while the subject is illuminated with the illumination (as well as being illuminated by ambient lighting). In some embodiments, the data may be accessed by directly obtaining the data from the imaging device (e.g., during operation of the imaging device). In some embodiments, the data may be accessed by accessing a memory storing the data (e.g., the data may be stored in the memory after being obtained by the imaging device).

Each image in the sequence may correspond to individual frames acquired by the imaging device. Thus, the frame rate of the imaging device may relate to the number of frames/images obtained by the imaging device over a period of time.

The sinusoidal intensity modulation in time means that the subject is illuminated with illumination with an intensity which varies sinusoidally over time. In other similar words, the illumination may be modulated such that the variation in intensity follows a sinusoidal pattern.

The sinusoidal intensity modulation is associated with a frequency of modulation (e.g., the frequency of the sinusoidal pattern). As will be explained in more detail below, this frequency may be such that the different spatial intensity modulation pattern is apparent in consecutive images of the sequence.

The method 100 comprises, at block 104, determining, based on a set of measured pixel intensity values in each of the sequence of images, a set of revised pixel intensity values for generating a revised image of the subject such that a reduced level of ambient lighting is apparent in the revised image compared with the level of ambient lighting apparent in at least one of the sequence of images. In other words, the determined set of revised pixel intensity values may refer to an estimated intensity distribution for an image of the subject, to reduce ambient lighting variation in the image (i.e., 'revised image'). This determination may be based on the spatial intensity modulation pattern (or the corresponding 'set of measured pixel intensity values') in each of the sequence of images.

As referred to herein, the term 'estimated intensity distribution' may refer to the 'set of revised pixel intensity values'. The term 'spatial intensity modulation pattern' may refer to the corresponding 'set of measured pixel intensity values'

The estimated intensity distribution may refer to the intensity distribution for the image that takes into account any ambient lighting variation apparent in the image. For example, if the ambient lighting is such that a certain part of the subject is illuminated by the ambient lighting that is brighter than the ambient lighting for another part of the subject, this ambient lighting variation may be reduced, compensated for or otherwise corrected in the image.

In the example given above, the estimated intensity distribution may indicate that for the part of the subject that is brighter due to the ambient lighting variation, the pixel intensity values corresponding to this part of the subject are to be reduced (e.g., so that the 'corrected' image appears less bright in this part). Similarly, the estimated intensity distribution may indicate that for the part of the subject that is darker due to the ambient lighting variation, the pixel intensity values corresponding to this part of the subject are to be increased (e.g., so that the 'corrected' image appears brighter in this part). In other cases, the pixel values for one of the parts of the image may be adjusted rather than adjusting the pixel values for all of the parts featuring the ambient lighting variation. Certain embodiments described herein refer to various potential ways for the estimated intensity distribution to reduce ambient lighting variations.

In some cases, the image for which the estimated intensity distribution is determined may be one of the sequence of images providing the data. In some cases, the image may be a different (e.g., subsequent) image to the sequence of images.

In some embodiments, the estimated intensity distribution may be calculated for a particular image in order to reduce the effect that the ambient lighting variation within the setting at that time has on the image. In other similar words, pixel intensity values may be calculated for the particular image that takes into account (e.g., reduce the effect of) the ambient lighting variation in the setting.

In some embodiments, the set of revised pixel intensity values are determined such that both: the level of ambient lighting and a modulation depth of the spatial intensity modulation pattern is reduced in the revised image compared with at least one of the sequence of images.

In some embodiments, the modulation depth may refer to a difference between a maximum and minimum measured pixel intensity value in an image of the sequence comprising the spatial intensity modulation pattern. For example, the spatial intensity modulation pattern may correspond to a sinusoidal spatial modulation pattern. In the revised image, the modulation depth of the spatial intensity modulation pattern may be reduced or removed such that the (e.g., applied) illumination appears to be evenly distributed spatially across the revised image while the apparent ambient lighting is reduced. Thus, in some embodiments, the illumination apparent in the revised image is due to the illumination rather than the ambient illumination (or at least the illumination is dominant over the ambient illumination).

In some embodiments, determining the set of revised pixel intensity values comprises computing, for each pixel of the set, a specified combination of the pixel's measured pixel intensity values from each of the sequence of images. The specified combination may be determined based on the sinsusoidal intensity modulation of the illumination.

In some embodiments, the sinsusoidal (temporal) intensity modulation property of the illumination may be leveraged in order to determine the specified combination. For example, due to the sinsusoidal (temporal) intensity modulation property of the illumination, it may be possible to determine the 'specified combination of measured pixel intensity values from the sequence of images' that generates the set of revised pixel values that correspond to a reduced level of ambient lighting being apparent in the revised image while also reducing or removing the 'modulation depth' of the (spatial) intensity modulation pattern that is apparent in the sequence of images (i.e., due to the sinusoidal (temporal) intensity modulation property of the illumination and the configuration of the imaging device such as operating in rolling shutter mode). An example specified combination is given below.

In some embodiments, a frequency of the sinusoidal intensity modulation and a frame rate of the imaging device is such that the different spatial intensity modulation pattern is apparent in consecutive images of the sequence. For example, the frequency of the sinusoidal intensity modulation may not be an integral multiple of the frame rate of the imaging device.

In some embodiments, a phase difference between the sinusoidal intensity modulation and frame acquisition timing of the imaging device is such that the different spatial intensity modulation pattern is apparent in consecutive images of the sequence.

A combination of the above two embodiments may be implemented such that the different spatial intensity modulation pattern is apparent in consecutive images of the sequence.

As mentioned above, the imaging device is configured such that a different spatial intensity modulation pattern is apparent in consecutive images of the sequence. In this regard, the imaging device is configured to obtain, within each image of the sequence, a first spatial portion of the image at a different time to a second, different, spatial portion of the image such that the different spatial intensity modulation pattern is apparent in consecutive images of the sequence.

Depending on the level of illumination provided at a certain time according to the sinusoidal intensity modulation, different spatial portions of the image may exhibit different intensity levels. In other similar words, as the level of illumination varies, the spatial portion of the imaging device that collects imaging data at a certain time may collect imaging data corresponding to the illumination level at that certain time. For example, if the modulated illumination level is at a minimum at a certain time, the spatial portion of the image that collected imaging data at that certain time may be dark. However, if the modulated illumination level is at a maximum at a certain different time, the spatial portion of the image that collected imaging data at that certain different time may be relatively brighter.

In some embodiments, the imaging device may be configured to operate in a rolling shutter mode. In rolling shutter mode, different spatial portions of the image may be sampled at different times within a single frame.

An example of the rolling shutter mode may refer to a method of image acquisition where data from pixels of an imaging device sensor is acquired one pixel line after another pixel line (in some cases, multiple pixel lines may be scanned across the sensor at any time). For example, the data is obtained by acquiring the pixel values from each pixel row/column of the imaging device sensor while scanning vertically or horizontally across the imaging device sensor. Thus, pixel data is not obtained at the same time from all of the pixels of the imaging device sensor. Rather, there may be a time delay between the pixel data from different pixel rows/columns within the same frame. Where the subject being imaged is moving at a certain speed (or the image is otherwise changing), depending on the frame rate of the imaging device, the roller shutter mode may cause what is referred to as a 'rolling shutter effect' in the image.

The combined effect of, for example, the rolling shutter mode and the sinusoidal intensity modulation of the illumination may cause the spatial intensity modulation pattern observed in each of the sequence of images. Thus, as the illumination intensity is modulated in time, the pixels at a given position on the imaging device sensor detect the corresponding illumination level (i.e., from the ambient lighting as well as the modulated illumination) at a given time. Within a single image (frame) captured by the imaging device, the modulation of the illumination may be apparent due to the pixels (at a certain location of the imaging device sensor) registering the intensity value at a certain time (for example, due to the rolling shutter mode) where the detected illumination level at that time depends on modulation of the illumination. For example, if a peak illumination level (due to the modulation) occurs at time t1 within a frame, the pixels which provide their reading at that time t1 will register a greater intensity value than pixels (at a different spatial location on the imaging device sensor) at another time t2 within the frame (for example, where time t2 refers to when the illumination level is at its lowest level due to the modulation). This effect may result in the spatial intensity modulation pattern observed in each of the images. As will be explained in more detail below, the difference in the spatial intensity modulation pattern observed in the sequence of images may be exploited to determine the estimated intensity distribution.

In some examples, certain methods and apparatus described herein may facilitate precise and/or accurate measurements of certain surface characteristics such as color, texture and/or any other surface characteristics. For example, where the subject is a human (or any animal) and the surface being imaged is their skin (e.g., facial skin), certain methods and apparatus described herein may improve imaging in certain settings (such as if the ambient lighting is uncontrolled and/or varying). Surface characteristics of skin that may be of interest for certain applications include, for example, skin color, skin health, skin texture and/or any other characteristic of the skin which may be of interest. Imaging of the skin may facilitate, for example, skin feature characterization and/or tracking/monitoring the skin over time for certain applications such as skin sensing for personal care and health applications.

Figure 2:
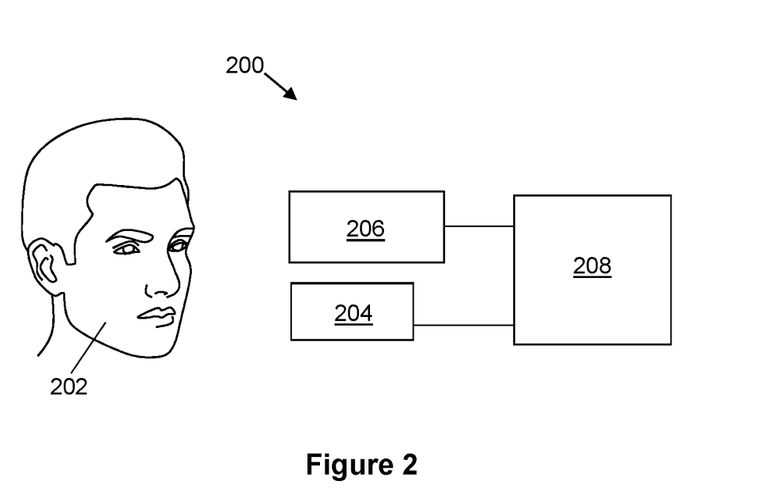
FIG. 2 is a schematic drawing of a system for improving imaging in certain settings according to an embodiment.

FIG. 2 is a schematic drawing of a system 200 for improving imaging in certain settings. The system 200 may implement certain methods described herein (e.g., method 100). In this embodiment, a subject 202 is in a setting where there is uncontrolled and/or potentially varying ambient lighting.

The system 200 comprises an imaging device 204 for obtaining images (e.g., a sequence of images) of the subject 202.

The system 200 further comprises an illumination source 206 such as a smartphone flash or other device capable of providing illumination with sinusoidal intensity modulation. For example, a controller (e.g., of the illumination source 206 itself or an external controller) may vary the power (e.g., voltage and/or current) supplied to the illumination source 206 in accordance with a sinusoidal modulation over time.

The system 200 further comprises a control module 208 for implementing certain functionality. In some embodiments, the control module 208 may control the imaging device 204 (e.g., cause the imaging device 204 to obtain images, receive those images from the imaging device 204 and/or store data corresponding to those images in a memory of or accessible to the control module 208). In some embodiments, the control module 208 may control the illumination source 206 (e.g., cause the illumination source 206 to modulate the intensity of the illumination it provides and/or control the power supplied to the illumination source 206). In some embodiments, the control module 208 may implement certain methods described herein. For example, the control module 208 may implement method 100 of FIG. 1. Any combination of the above embodiments may be implemented by the control module 208.

In some embodiments, the imaging device 204, illumination source 206 and control module 208 may be implemented by the same device (e.g., a 'smart' device such as a smartphone, tablet, or similar).

In some embodiments, the imaging device 204 and the illumination source 206 may be implemented by the same device (e.g., a 'smart' device such as a smartphone, tablet, or similar) while the control module 208 is implemented by a different device or service (e.g., a user computer, dedicated processing apparatus, server, cloud-based service or other types of processing apparatus).

In some embodiments, the imaging device 204 and the illumination source 206 may be implemented by different devices (e.g., one of the imaging device 204 and the illumination source 206 may be implemented by a smart device while the other of the imaging device 204 and the illumination source 206 may be implemented by a separate device (e.g., a dedicated device). In such embodiments, the control module 208 may be implemented by another separate device (e.g., a user computer, dedicated processing apparatus, server, cloud-based service or other type of processing apparatus) or the control module 208 may be implemented by one of the imaging device 204 and the illumination source 206.

In the case of a smart device, an onboard camera may provide the functionality of the imaging device 204, an onboard flash may provide the functionality of the illumination source 206 and/or the onboard processing circuitry may provide the functionality of the control module 208.

Figure 3:
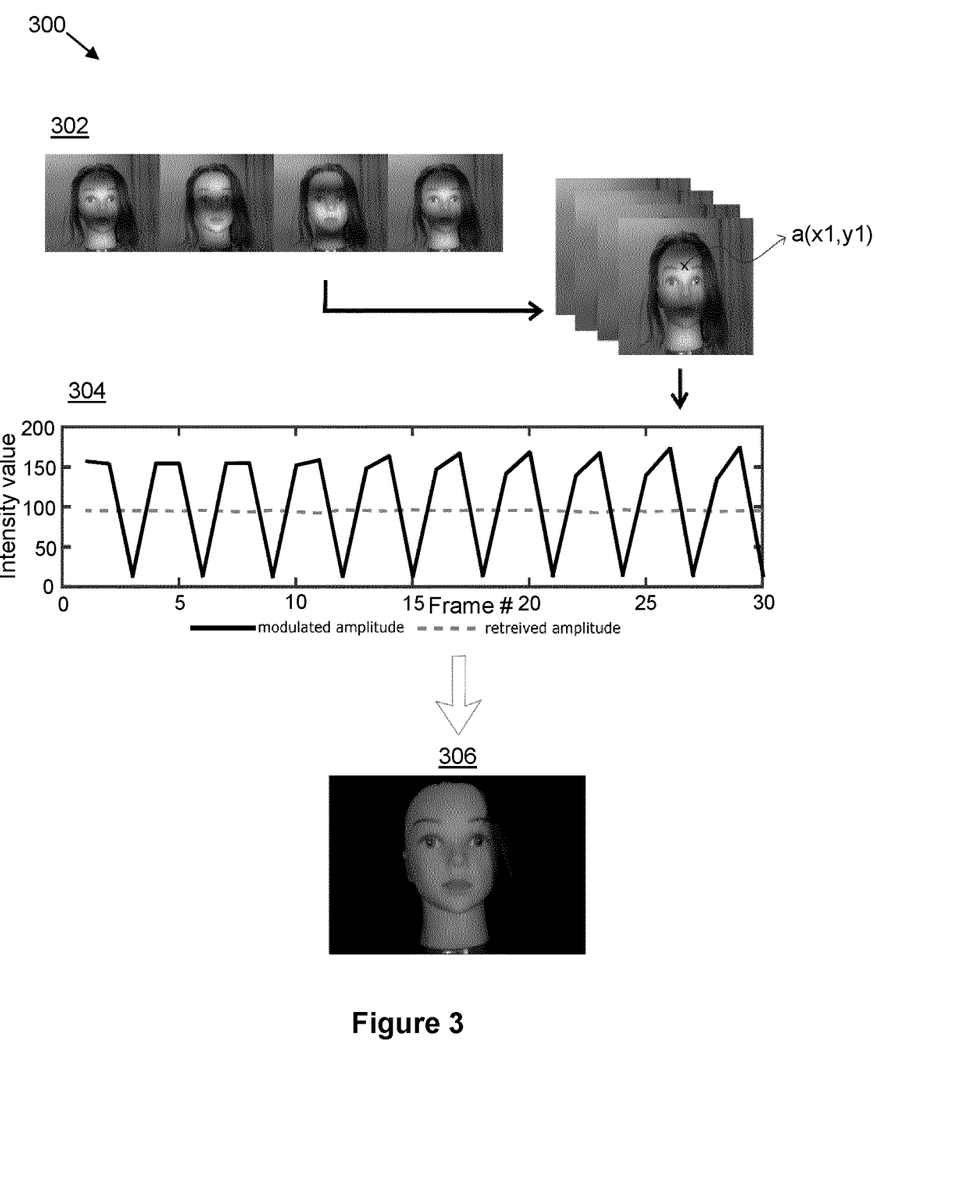
FIG. 3 is a schematic drawing of a procedure for improving imaging in certain settings according to an embodiment.

FIG. 3 depicts a procedure 300 for improving imaging in certain settings according to an embodiment. The procedure 300 involves accessing data from a sequence of images 302 (four consecutive images in this example) which feature the spatial intensity modulation pattern described above. The subject in the images 302 is a face but could be any other object whose surface features are of interest within the setting. As can be seen in FIG. 3, each consecutive image has a different spatial intensity modulation pattern (in this embodiment this is due to the imaging device operating in rolling shutter mode and the sinusoidal intensity modulated illumination). Based on this information it is possible to determine the ambient lighting variation in the image, in order to estimate intensity distribution for an image that reduces the effect of, compensates for or otherwise corrects for the ambient lighting variation in the setting.

A pixel intensity value, a(x1, y1), for a pixel at coordinates x1, y1 of the imaging device sensor may be tracked across the sequence of images 302 (i.e., a 'pixel train') to determine the intensity value at this pixel as a function of image (frame) number. As shown by graph 304 in FIG. 3, the selected pixel a(x1, y1) varies in terms of its intensity value (i.e., the 'modulated amplitude' at the pixel) in a relatively repeatable manner across the sequence of images 302 (30 frames are depicted by graph 304). As will be explained in more detail below, the 'corrected' amplitude (i.e., 'intensity value') may be retrieved based on the data in graph 304. Accordingly, by tracking the pixel intensity values for all of the pixels across the sequence of images 302, it is possible to reconstruct the 'corrected' image 306 from this data (i.e., the image 306 now takes into account ambient lighting variation in its setting to reduce the effect of, compensate for or otherwise correct for this ambient lighting variation).

Due to the convolution property of harmonic temporal modulation, the combination of an imaging device operating in, for example, rolling shutter mode and sinusoidal modulation of the illumination results in each individual 'pixel data stream' of the resulting sequence of images also exhibiting strictly sinusoidal spatial modulation in the resulting image. Under these conditions, it has been found relatively few images are needed to estimate the intensity distribution for an image of the subject in the setting.

For example, if each pixel in the 'pixel train' is equally spaced in time, then the amplitude of the temporal modulation can be retrieved with four consecutive images. Thus, in some embodiments, determining the estimated intensity distribution for the image may be based on four consecutive images from the sequence of images.

In another example, if the phase relationship with the sinusoidal modulation of the illumination and the imaging device frame rate is such that every fourth image in the sequence has the same spatial intensity modulation pattern as that of the first image in the sequence, then the amplitude of the temporal modulation can be retrieved with three consecutive images. Thus, in some embodiments, determining the estimated intensity distribution for the image may be based on three consecutive images from the sequence of images. Further, in some embodiments, determining the estimated intensity distribution for the image may be based on three consecutive images from the sequence of images where the spatial intensity modulation pattern for a first and fourth consecutive image in the sequence of images is the same.

In scenarios where the subject is moving (e.g., a subject such as a human may not be static due to voluntary and/or involuntary motion), the effect of this movement may change the apparent ambient lighting variation over a short period of time. Being able to use three or four images (instead of many more images) may reduce the effect of this movement to some extent. For a 30 frames per second (fps) imaging device, where four images are used, these images are acquired over 133 milliseconds. This may be regarded as a sufficiently short timescale over which to collect the data from the sequence of images while minimizing the opportunity for voluntary or involuntary movement by the subject to adversely affect the results of the estimation of the intensity distribution.

In some embodiments, the frequency of the sinusoidal intensity modulation is more than double the frame rate of the imaging device. In this case, at least two intensity peaks may be apparent in each image of the sequence (e.g., as depicted in FIG. 3).

In some embodiments, the frequency of the sinusoidal intensity modulation is at least 70 Hz (e.g., for flickerless perception). This is an example of the frequency of the sinusoidal intensity modulation being more than double the frame rate of the imaging device (e.g., for a frame rate of 30 Hz). If a different frame rate is possible with the imaging device (e.g., a faster frame rate), the frequency of the sinusoidal intensity modulation may be adjusted accordingly (e.g., increased so as to be at least double the frame rate of the imaging device).

In some embodiments, there may be a different relationship between the frequency of the sinusoidal intensity modulation and the frame rate of the imaging device. For example, the frequency of the sinusoidal intensity modulation may be of order 50 Hz where the frame rate of the imaging device is 30 Hz.

Certain procedures for estimating the intensity distribution have been described above. In some embodiments, the estimated intensity distribution, A, for the image may be given by:

$$A = \frac{\sqrt{(I3(x,y)-I2(x,y))^2 - (I2(x,y)-I1(x,y))*(I4(x,y)-I3(x,y))}}{\sqrt{2} * \left(1 - \frac{(I2(x,y)-I1(x,y))+(I4(x,y)-I3(x,y))}{2*(I3(x,y)-I2(x,y))}\right) * \sqrt{1 + \frac{(I2(x,y)-I1(x,y))+(I4(x,y)-I3(x,y))}{2*(I3(x,y)-I2(x,y))}}}$$

where I1(x, y), I2(x, y), I3(x, y) and I4(x, y) respectively represent a pixel intensity value of a first, second, third and fourth consecutive image in the sequence of images. That is, for each pixel value (x, y) in the image, by using the data from the sequence of images, it is possible to estimate the intensity distribution for the image that takes into account the ambient lighting variation. This procedure may be run continually such that as each new frame is acquired, this data is input to the expression for 'A' while using the data from the prior three frames. This may allow for a continual update of the image that takes into account the ambient lighting variation.

In some cases, poor control of the image acquisition process by the imaging device may result in certain expected behavior. For example, if the timing of the imaging device is now well controlled, it may be difficult to coordinate the sinusoidal modulation of the illumination and the image acquisition process. Thus, it may be possible to calculate a phase progression, φT, of the spatial intensity modulation pattern in the sequence of images according to:

$$\cos\varphi T = \frac{(I2(x,y)-I1(x,y))+(I4(x,y)-I3(x,y))}{2*(I3(x,y)-I2(x,y))}$$

where I1(x, y), I2(x, y), I3(x, y) and I4(x, y) respectively represent a pixel intensity value of a first, second, third and fourth consecutive image in the sequence of images. This phase progression may be taken into account when estimating the intensity distribution in the image. In some cases, the phase progression may be used to improve the coordination between the sinusoidal intensity modulation for the illumination and the image capture timing of the imaging device.

Some imaging devices (such as some non-scientific cameras) may have an inbuilt nonlinear (e.g., gamma) correction (e.g., an example of a nonlinear response of the imaging device). If not characterized before implementing certain methods described herein, this nonlinear correction may need to be accounted for when attempting to perform any quantitative measurements using the images acquired by the imaging device. Gamma 'de-correction' (i.e., inverse gamma correction) may be useful in some cases for estimating the intensity distribution where the imaging device implements gamma correction. In some scenarios, the gamma correction implemented by a certain imaging device may be available (e.g., if the manufacturer publishes this information) to a user implementing the method described herein without performing any specific measurements using the imaging device.

Thus, in some embodiments, a nonlinear response of the imaging device may be compensated for prior to accessing the data from the sequence of images and determining the estimated intensity distribution.

In some embodiments, the nonlinear response of the imaging device may be determined by obtaining an indication of a mean intensity of a kernel (where a kernel refers to at least one pixel selected in the image) sampled from a set of images (e.g., part of an image may be sampled and/or a number of images may be sampled from the set of images) of an object (e.g., the subject referred to above or another object) acquired by the imaging device. The nonlinear response of the imaging device can then be determined based on the indication. This nonlinear response can be used to identify the compensation (e.g., comprising inverse gamma correction) to apply to the data corresponding to the sequence of images in order to compensate for the nonlinear response of the imaging device.

For example, compensating for the nonlinear response of the imaging device may comprise performing inverse gamma correction to compensate for the nonlinear response due to gamma correction applied to images acquired by the imaging device.

Figure 4:
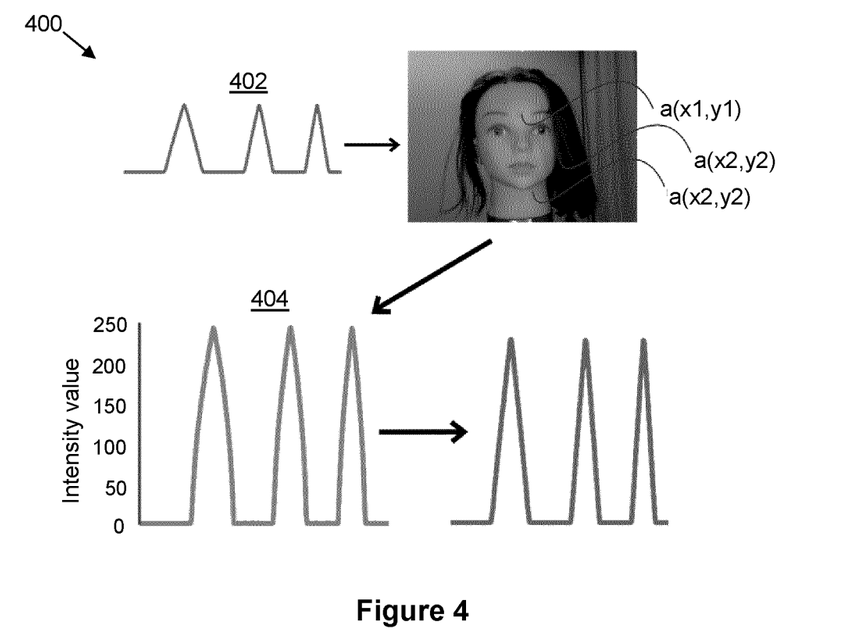
FIG. 4 is a schematic drawing of a procedure for improving imaging in certain settings according to an embodiment.

FIG. 4 depicts a procedure 400 for improving imaging in certain settings according to an embodiment. The procedure 400 involves characterizing the nonlinear response of an imaging device (not shown) in order to determine the characteristics of the nonlinear (e.g., gamma) correction implemented by the imaging device (and thereby enabling the compensation to compensate for the nonlinear response to be applied to the sequence of images before implementing certain methods described herein).

In this embodiment, an illumination source is caused to illuminate an object by modulating the illumination source in accordance with an illumination function. The illumination function 402 in this embodiment is configured to at least one of: linearly increase and linearly decrease an intensity of the illumination function 402 over a specified time interval while obtaining the indication of the mean intensity of the kernel (e.g., the pixel intensity values: a(x1, y1), a(x2, y2) and a(x3, y3) in FIG. 4) sampled from the set of images. This linear increasing and decreasing depicted by illumination function 402 causes the illumination source to correspondingly increase and decrease the level of illumination provided. The imaging device (not shown) obtains a set of images over a period of time. By tracking the kernel over these sets of images, the intensity value for each kernel is registered in order to generate graph 404. As can be seen from this graph, a linear increase or decrease in illumination does not correspond to a linear imaging device response. Based on the curvature (i.e., nonlinearity) of the imaging device response, an appropriate compensation (e.g., inverse gamma correction) can be determined. This may be taken into account before implementing certain methods described herein. That is, the pixel values for certain intensity levels may be appropriately adjusted before implementing such methods.

Figure 5:
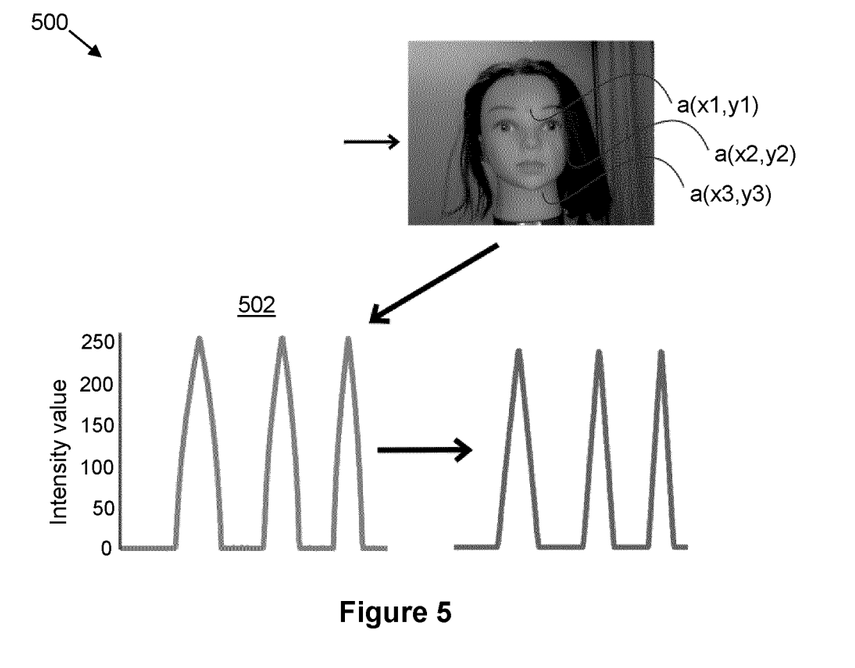
FIG. 5 is a schematic drawing of a procedure for improving imaging in certain settings according to an embodiment.

FIG. 5 depicts a procedure 500 for improving imaging in certain settings according to an embodiment. Like procedure 400, the procedure 500 involves characterizing the response of an imaging device (not shown) in order to determine the characteristics of the nonlinear (e.g., gamma) correction implemented by the imaging device (and thereby enabling the compensation to compensate for the nonlinear response to be applied to the sequence of images before implementing certain methods described herein).

In this embodiment, the imaging device is caused to acquire a set of images in accordance with an imaging acquisition function. The imaging acquisition function in this embodiment is configured to one of: linearly increase and linearly decrease an exposure time for each subsequent image of the set of images while obtaining the indication of the mean intensity of the kernel (e.g., the pixel intensity values: a(x1, y1), a(x2, y2) and a(x3, y3) in FIG. 5) sampled from the set of images.

This linear increasing and/or decreasing of the exposure time causes each of the set of images to register the corresponding increasing and/or decreasing intensity levels. By tracking the kernel over these sets of images, the intensity value for each kernel is registered in order to generate graph 502. As can be seen from this graph, a linear increase or decrease in exposure time does not correspond to a linear imaging device response. Based on the curvature (i.e., nonlinearity) of the imaging device response, an appropriate compensation (e.g., inverse gamma correction) can be determined. This may be taken into account before implementing certain methods described herein. That is, the pixel values for certain intensity levels may be appropriately adjusted before implementing such methods.

Figure 6:
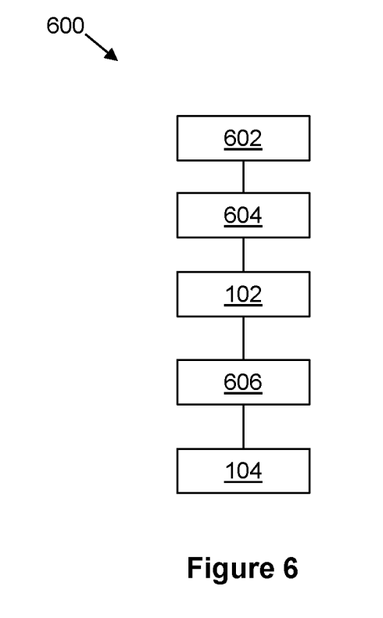
FIG. 6 refers to a method of improving imaging in certain settings according to an embodiment.

FIG. 6 shows a method 600 (e.g., a computer-implemented method) of improving imaging in certain settings. For example, imaging may be affected by certain settings such as in an uncontrolled environment where the illumination/ambient lighting is undefined and/or potentially varying. The method 600 may be implemented in conjunction with or as part of method 100 and/or with reference to procedures 300, 400, 500. In this example, the method 600 comprises the blocks 102 to 104 of FIG. 1. Any of the blocks of the method 600 may be omitted and/or re-ordered, as appropriate.

In some embodiments, the method 600 comprises, at block 602, compensating for a nonlinear response of the imaging device (e.g., as described above) prior to: accessing the data from the sequence of images; and determining the estimated intensity distribution.

In some embodiments, the method 600 comprises, at block 604, causing an illumination source to provide the illumination having the sinusoidal intensity modulation in time.

In some embodiments, the method 600 comprises, at block 606, calculating the phase progression, φT, of the spatial intensity modulation pattern in the image (e.g., as described above).

Figure 7:
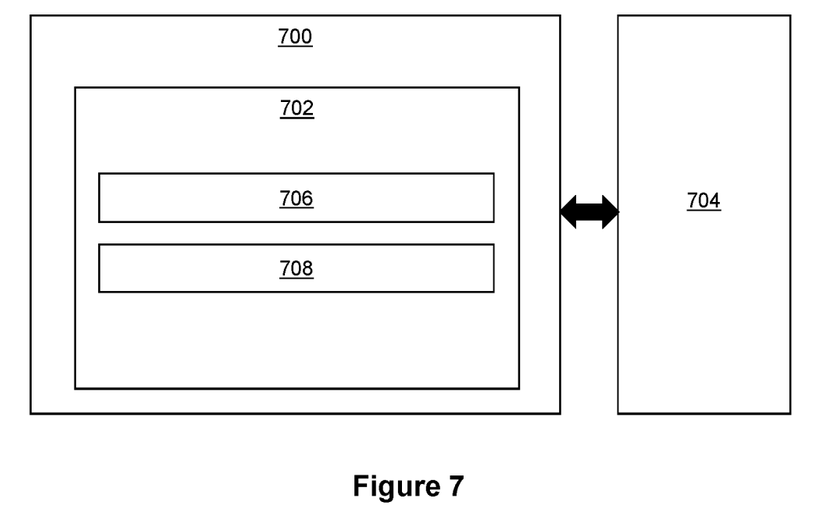
FIG. 7 is a schematic drawing of a machine-readable medium for improving imaging in certain settings according to an embodiment.

FIG. 7 shows a tangible machine-readable medium 700 storing instructions 702 which, when executed by at least one processor 704, cause the at least one processor 704 to implement certain methods described herein (such as the method 100 and/or the method 600).

In this embodiment, the instructions 702 comprise instructions 706 to cause the at least one processor 704 to implement block 102 of the method 100. The instructions 702 further comprise instructions 708 to cause the at least one processor 704 to implement block 104 of the method 100.

Figure 8:
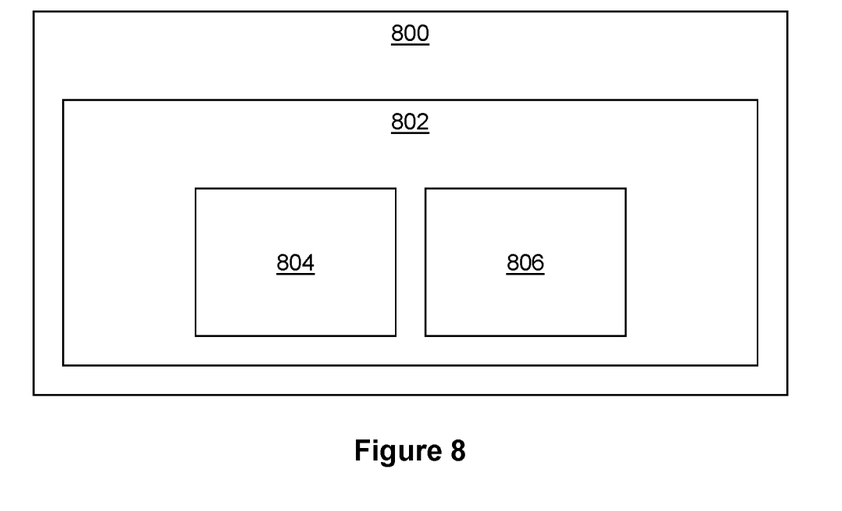
FIG. 8 is a schematic drawing of an apparatus for improving imaging in certain settings according to an embodiment.

FIG. 8 shows an apparatus 800, which may be used for implementing certain methods described herein such as the method 100 and/or the method 800. The apparatus 800 may comprise modules with functionality corresponding to certain features described in relation to the system 200 of FIG. 2 such as the control module 208 thereof.

The apparatus 800 comprises processing circuitry 802. The processing circuitry 802 comprises an accessing module 804. The accessing module 804 is configured to access data from a sequence of images of a subject illuminated with ambient lighting and illumination having a sinusoidal intensity modulation in time. The imaging device is configured such that a different spatial intensity modulation pattern is apparent in consecutive images of the sequence.

The processing circuitry 802 further comprises a determining module 806. The determining module 806 is configured to determine, based on a set of measured pixel intensity values in each of the sequence of images, a set of revised pixel intensity values for generating a revised image of the subject such that a reduced level of ambient lighting is apparent in the revised image compared with the level of ambient lighting apparent in at least one of the sequence of images. In other words, the determining module 806 may be configured to determine, based on the spatial intensity modulation pattern (or 'set of measured pixel intensity values') in each of the sequence of images, an estimated intensity distribution (or 'set of revised pixel intensity values') for an image of the subject to reduce ambient lighting variation in the image.

In some embodiments, the apparatus 800 further comprises an illumination source (e.g., the illumination source 206 of FIG. 2) for providing the illumination. In some embodiments, the apparatus further comprises an imaging device (e.g., the imaging device 204 of FIG. 2).

While the invention has been illustrated and described in detail in the drawings and foregoing description, such illustration and description are to be considered illustrative or exemplary and not restrictive; the invention is not limited to the disclosed embodiments.

One or more features described in one embodiment may be combined with or replace features described in another embodiment. For example, the methods 100, 600 of FIG. 1 or 6 may be modified based on features described in relation to the system 200, procedures 300, 400, 500 and/or the apparatus 800 of FIGS. 2, 3, 4, 5, 8, and vice versa.

Embodiments in the present disclosure can be provided as methods, systems or as a combination of machine-readable instructions and processing circuitry. Such machine-readable instructions may be included on a non-transitory machine (for example, computer) readable storage medium (including but not limited to disc storage, CD-ROM, optical storage, etc.) having computer readable program codes therein or thereon.

The present disclosure is described with reference to flow charts and block diagrams of the method, devices and systems according to embodiments of the present disclosure. Although the flow charts described above show a specific order of execution, the order of execution may differ from that which is depicted. Blocks described in relation to one flow chart may be combined with those of another flow chart. It shall be understood that each block in the flow charts and/or block diagrams, as well as combinations of the blocks in the flow charts and/or block diagrams can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing circuitry, or a module thereof, may execute the machine readable instructions. Thus functional modules of the system 200 and/or the apparatus 800 (for example, control module 208, the accessing module 804 and/or the determining module 804) and other devices described herein may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a computer readable storage that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices realize functions specified by block(s) in the flow charts and/or in the block diagrams.

Further, the teachings herein may be implemented in the form of a computer program product, the computer program product being stored in a storage medium and comprising a plurality of instructions for making a computer device implement the methods recited in the embodiments of the present disclosure.

Elements or steps described in relation to one embodiment may be combined with or replaced by elements or steps described in relation to another embodiment. Other variations to the disclosed embodiments can be understood and effected by those skilled in the art in practising the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored or distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A computer-implemented method comprising:
    accessing data from a sequence of images, obtained by an imaging device, of a subject illuminated with ambient lighting and illumination having a sinusoidal intensity modulation in time, wherein the imaging device is configured to operate in rolling shutter mode to obtain, within each image of the sequence of images, a first spatial portion of the image at a different time to a different, second spatial portion of the image, wherein a relationship between a frequency of the sinusoidal intensity modulation and a frame rate of the imaging device is such that a different spatial intensity modulation pattern is apparent in consecutive images of the sequence of images, and
    determining, based on a set of measure pixel intensity values in each image of the sequence of images, a set of revised pixel intensity values for generating a revised image of the subject by computing, for each pixel of the set of revised pixel intensity values, a specified combination of the pixel's measured pixel intensity values from each image of the sequence of images that generates the set of revised pixel intensity values that correspond to a reduced level of ambient lighting and a reduced modulation depth of the spatial intensity modulation pattern being apparent in the revised image compared with a level of ambient lighting and a modulation depth of the spatial intensity modulation pattern apparent in at least one image of the sequence of images, wherein the specified combination is based on the image device operating in the rolling shutter mode and the sinusoidal intensity modulation of the illumination resulting, due to a convolution property of harmonic temporal modulation, in each of the pixel's measured pixel intensity values from each image of the sequence of images exhibiting a sinusoidal intensity variation across the sequence of images.

2. The method of claim 1, wherein determining the set of revised pixel intensity values for the revised image is based on three or four consecutive images from the sequence of images.

3. The method of claim 1, wherein a frequency of the sinusoidal intensity modulation and a frame rate of the imaging device are such that the different spatial intensity modulation pattern is apparent in consecutive images of the sequence of images.

4. The method of claim 3, wherein the frequency of the sinusoidal intensity modulation is not an integral multiple of the frame rate of the imaging device.

5. The method of claim 1, further comprising:
    causing an illumination source to provide the illumination having the sinusoidal intensity modulation in time.

6. The method of claim 1, wherein the set of revised pixel intensity values, A, for the revised image is given by the specified combination:

$$A = \frac{\sqrt{(I3(x,y) - I2(x,y))^2 - (I2(x,y) - I1(x,y)) * (I4(x,y) - I3(x,y))}}{\sqrt{2} * \left(1 - \frac{(I2(x,y) - I1(x,y)) + (I4(x,y) - I3(x,y))}{2 * (I3(x,y) - I2(x,y))}\right) *} \sqrt{1 + \frac{(I2(x,y) - I1(x,y)) + (I4(x,y) - I3(x,y))}{2 * (I3(x,y) - I2(x,y))}}$$

where I1(x,y), I2(x,y), I3(x,y) and I4(x,y) respectively represent a pixel intensity value of a first, second, third and fourth consecutive image in the sequence of images.

7. The method of claim 1, further comprising calculating a phase progression, φT, of the spatial intensity modulation pattern in the sequence of images according to:

$$\cos\varphi T = \frac{(I2(x,y) - I1(x,y)) + (I4(x,y) - I3(x,y))}{2 * (I3(x,y) - I2(x,y))}$$

where I1(x,y), I2(x,y), I3(x,y) and I4(x,y) respectively represent a pixel intensity value of a first, second, third and fourth consecutive image in the sequence of images.

8. The method of claim 1, further comprising:
    compensating for a nonlinear response of the imaging device prior to accessing the data from the sequence images
    wherein the nonlinear response of the imaging device is determined by:
    obtaining an indication of a mean intensity of a kernel comprising at least one pixel selected in an image sampled from a set of images of an object acquired by the imaging device; and
    determining the nonlinear response of the imaging device based on the indication of the mean intensity obtained for each image from the set of images.

9. The method of claim 8, further comprising:
    causing an illumination source to illuminate the object by modulating the illumination source in accordance with an illumination function, wherein the illumination function is configured to at least one of linearly increase or linearly decrease an intensity of the illumination function over a specified time interval while obtaining the indication of the mean intensity of the kernel sampled from the set of images.

10. The method of claim 8, further comprising:
causing the imaging device to acquire the set of images in accordance with an imaging acquisition function, wherein the imaging acquisition function is configured to one of linearly increase or linearly decrease an exposure time for each subsequent image of the set of images while obtaining the indication of the mean intensity of the kernel sampled from the set of images.

11. The method of claim 1, wherein a phase difference between the sinusoidal intensity modulation and frame acquisition timing of the imaging device is such that the different spatial intensity modulation pattern is apparent in consecutive images of the sequence of images.

12. A tangible, non-transitory, machine-readable medium storing instructions which, when executed by at least one processor, cause the at least one processor to implement the method according to claim 1.

13. An apparatus comprising processing circuitry, the processing circuitry comprising:
an accessing module configured to access data from a sequence of images, obtained by an imaging device, of a subject illuminated with ambient lighting and illumination having a sinusoidal intensity modulation in time, wherein the imaging device is configured to operate in rolling shutter mode to obtain, within each image of the sequence of images, a first spatial portion of the image at a different time to a different, second spatial portion of the image, wherein a relationship between a frequency of the sinusoidal intensity modulation and a frame rate of the imaging device is such that a different spatial intensity modulation pattern is apparent in consecutive images of the sequence of images; and
a determining module configured to determine, based on a set of measured pixel intensity values in each image of the sequence of images, a set of revised pixel intensity values for generating a revised image of the subject by computing, for each pixel of the set of revised pixel intensity values, a specified combination of the pixel's measured pixel intensity values from each image of the sequence of images that generates the set of revised pixel intensity values that correspond to a reduced level of ambient lighting and a reduced modulation depth of the spatial intensity modulation pattern being apparent in the revised image compared with a level of ambient lighting and a modulation depth of the spatial intensity modulation pattern apparent in at least one of the sequence of images, wherein the specified combination is based on the imaging device operating in the rolling shutter mode and the sinusoidal intensity modulation of the illumination resulting, due to a convolution property of harmonic temporal modulation, in each of the pixel's measured pixel intensity values from each image of the sequence of images exhibiting a sinusoidal intensity variation across the sequence of images.

14. An apparatus for improving imaging of a subject, the apparatus comprising:
at least one processor coupled to an imaging device and an illumination source; and
a non-transitory memory storing instructions that, when executed by the at least one processor, cause the at least one processor to:
access data from a sequence of images of the subject obtained by the imaging device while the subject is illuminated with ambient lighting and illumination from the illumination source having a sinusoidal intensity modulation in time, wherein the imaging device is configured to operate in rolling shutter mode to obtain, within each image of the sequence of images, a first spatial portion of the image at a different time to a second spatial portion of the image, wherein a relationship between a frequency of the sinusoidal intensity modulation and a frame rate of the imaging device is such that a different spatial intensity modulation pattern is apparent is consecutive images of the sequence of images; and
determine, based on a set of measured pixel intensity values in each image of the sequence of images, a set of revised pixel intensity values for generating a revised image of the subject by computing, for each pixel of the set of revised pixel intensity values, a specified combination of measured pixel intensity values of the pixel from each image of the sequence of images that generates the set of revised pixel intensity values that correspond to a reduced level of ambient lighting and a reduced modulation depth of the spatial intensity modulation pattern being apparent in the revised image compared with a level of ambient lighting and a modulation depth of the spatial intensity modulation pattern apparent in at least one of the images of the sequence of images, wherein the specified combination is based on the imaging device operating in the rolling shutter mode and the sinusoidal intensity modulation of the illumination resulting, due to a convolution property of harmonic temporal modulation, in each of the measured pixel intensity values from each image of the sequence of images exhibiting a sinusoidal intensity variation across the sequence of images.

15. The apparatus of claim 14, wherein the instructions cause the at least one processor to determine the set of revised pixel intensity values for the revised image based on at least three consecutive images from the sequence of images.

16. The apparatus of claim 14, wherein the instructions further cause the at least one processor to:
determine a nonlinear response of the imaging device; and
compensate for the nonlinear response of the imaging device prior to accessing the data from the sequence of images.

17. The apparatus of claim 16, wherein the instructions cause the at least one processor to determine the nonlinear response of the imaging device by:
obtaining an indication of a mean intensity of a kernel comprising at least one pixel selected in an image sampled from a set of images of an object acquired by the imaging device; and
determining the nonlinear response of the imaging device based on the indication of the mean intensity obtained for each image from the set of images.

18. The apparatus of claim 17, wherein the instructions further cause the at least one processor to control the illumination source to illuminate the object by modulating the illumination source in accordance with an illumination function, wherein the illumination function is configured to at least one of linearly increase or linearly decrease an intensity of the illumination function over a specified time interval while obtaining the indication of the mean intensity of the kernel sampled from the set of images.

19. The apparatus of claim 17, wherein the instructions further cause the processor to control the imaging device to acquire the set of images in accordance with an imaging acquisition function, wherein the imaging acquisition function is configured to at least one of linearly increase or linearly decrease an exposure time for each subsequent image of the set of images while obtaining the indication of the mean intensity of the kernel sampled from the set of images.

\* \* \* \* \*